US008102446B2

(12) United States Patent
Sambongi

(10) Patent No.: US 8,102,446 B2
(45) Date of Patent: Jan. 24, 2012

(54) IMAGE CAPTURING SYSTEM AND IMAGE PROCESSING METHOD FOR APPLYING GRAYSCALE CONVERSION TO A VIDEO SIGNAL, AND COMPUTER-READABLE RECORDING MEDIUM HAVING RECORDED THEREON AN IMAGE PROCESSING PROGRAM FOR APPLYING GRAYSCALE CONVERSION TO A VIDEO SIGNAL

(75) Inventor: Masao Sambongi, Tokyo (JP)

(73) Assignee: Olympus Corporation, Tokyo (JP)

( * ) Notice: Subject to any disclaimer, the term of this patent is extended or adjusted under 35 U.S.C. 154(b) by 464 days.

(21) Appl. No.: 12/368,482

(22) Filed: Feb. 10, 2009

(65) Prior Publication Data
US 2009/0207285 A1 Aug. 20, 2009

(30) Foreign Application Priority Data

Feb. 15, 2008 (JP) ................................ 2008-034876

(51) Int. Cl.
*H04N 5/202* (2006.01)
*H04N 5/52* (2006.01)
*G03F 3/08* (2006.01)
*G06K 9/00* (2006.01)

(52) U.S. Cl. ........ 348/254; 348/674; 348/678; 358/519; 382/169

(58) Field of Classification Search .................. 348/254, 348/671, 672, 674, 675, 677, 678, 679; 358/519
See application file for complete search history.

(56) References Cited

U.S. PATENT DOCUMENTS

| | | | | |
|---|---|---|---|---|
| 6,373,533 B1* | 4/2002 | Kawabata et al. | ............ | 348/672 |
| 7,003,153 B1* | 2/2006 | Kerofsky | ........................ | 382/254 |
| 7,088,390 B2* | 8/2006 | Mori et al. | ..................... | 348/254 |
| 7,440,015 B2* | 10/2008 | Chen et al. | ..................... | 348/254 |
| 7,443,442 B2* | 10/2008 | Hirakoso et al. | .............. | 348/254 |
| 7,466,352 B2* | 12/2008 | Nakajima | ...................... | 348/254 |
| 7,755,681 B2* | 7/2010 | Lee | ............................... | 348/254 |
| 7,826,662 B2* | 11/2010 | Kato et al. | ..................... | 382/168 |
| 7,880,771 B2* | 2/2011 | Toyoda | ........................... | 348/254 |
| 7,903,066 B2* | 3/2011 | Weng et al. | .................... | 348/254 |
| 7,916,219 B2* | 3/2011 | Kodavalla | ...................... | 348/672 |

(Continued)

FOREIGN PATENT DOCUMENTS

JP 2001061065 A * 3/2001

(Continued)

OTHER PUBLICATIONS

Related U.S. Appl. No. 12/368,515, filed Feb. 10, 2009.

*Primary Examiner* — John Villecco
(74) *Attorney, Agent, or Firm* — Holtz, Holtz, Goodman & Chick, P.C.

(57) ABSTRACT

The present invention aims at obtaining a high-quality video signal by reducing tone jumps. A second grayscale conversion characteristic is calculated from a video signal to which a first grayscale conversion process has been applied using a first grayscale conversion characteristic used to convert an M-bit video signal into an N-bit video signal, where M and N are integers and M is larger than N. The second grayscale conversion characteristic is corrected by using the first grayscale conversion characteristic. A second grayscale conversion process is applied to the video signal by using the corrected second grayscale conversion characteristic.

13 Claims, 9 Drawing Sheets

U.S. PATENT DOCUMENTS

| | | | |
|---|---|---|---|
| 7,940,334 B2 * | 5/2011 | Tang et al. | 348/254 |
| 2005/0195298 A1 * | 9/2005 | Byun et al. | 348/254 |
| 2006/0204124 A1 * | 9/2006 | Aihara | 348/254 |
| 2008/0136763 A1 * | 6/2008 | Ohashi et al. | 348/254 |
| 2009/0207285 A1 * | 8/2009 | Sambongi | 348/254 |
| 2009/0322916 A1 * | 12/2009 | Wang et al. | 348/254 |

FOREIGN PATENT DOCUMENTS

| | | |
|---|---|---|
| JP | 2007-047244 A | 2/2007 |
| JP | 2007-088650 A | 4/2007 |

* cited by examiner

IMAGE CAPTURING SYSTEM AND IMAGE PROCESSING METHOD FOR APPLYING GRAYSCALE CONVERSION TO A VIDEO SIGNAL, AND COMPUTER-READABLE RECORDING MEDIUM HAVING RECORDED THEREON AN IMAGE PROCESSING PROGRAM FOR APPLYING GRAYSCALE CONVERSION TO A VIDEO SIGNAL

BACKGROUND OF THE INVENTION

1. Field of the Invention

The present invention relates to an image capturing system, an image processing method, and a computer-readable recording medium having an image processing program recorded thereon.

This application is based on Japanese Patent Application No. 2008-034876, the content of which is incorporated herein by reference.

2. Description of Related Art

In currently used digital still cameras or video cameras, a grayscale conversion process (for example, a gamma conversion process) is conventionally applied to a video signal, taking account of the display system. In order to obtain a higher-quality video signal desirable for the human eye, a known method involves applying a further grayscale conversion process by using information of the video signal to which the gamma conversion process has been applied, for example, by using histogram information, to adjust the contrast according to the video signal.

For example, Japanese Unexamined Patent Application, Publication No. 2007-88650 discloses a method in which it is judged in advance whether an overexposure phenomenon may occur in the original image through a density correction process, and when it is judged that an overexposure phenomenon may occur, a density correction curve is corrected to avoid the occurrence of an overexposure phenomenon. Japanese Unexamined Patent Application, Publication No. 2007-47244 discloses a method in which, when an image is deteriorated through the expansion of a grayscale range, an expansion process is applied according to the position where deterioration occurs.

BRIEF SUMMARY OF THE INVENTION

According to a first aspect, the present invention provides an image capturing system that applies grayscale conversion to a video signal transferred from an image capturing unit and outputs the video signal to which the grayscale conversion has been applied, including: a second-grayscale-conversion-characteristic calculating unit that calculates a second grayscale conversion characteristic from a video signal to which a first grayscale conversion process has been applied by using a first grayscale conversion characteristic used to convert an M-bit video signal into an N-bit video signal, where M and N are integers and M is larger than N; a second-grayscale-conversion-characteristic correcting unit that corrects the second grayscale conversion characteristic calculated by the second-grayscale-conversion-characteristic calculating unit, by using the first grayscale conversion characteristic; a first grayscale conversion unit that applies the first grayscale conversion process to the video signal by using the first grayscale conversion characteristic; and a second grayscale conversion unit that applies a second grayscale conversion process to the video signal to which the first grayscale conversion process has been applied by the first grayscale conversion unit, by using the second grayscale conversion characteristic corrected by the second-grayscale-conversion-characteristic correcting unit.

According to a second aspect, the present invention provides an image processing method of applying grayscale conversion to a video signal transferred from an image capturing unit and outputting the video signal to which the grayscale conversion has been applied, including the steps of: calculating a second grayscale conversion characteristic from a video signal to which a first grayscale conversion process has been applied by using a first grayscale conversion characteristic used to convert an M-bit video signal into an N-bit video signal, where M and N are integers and M is larger than N; correcting the second grayscale conversion characteristic by using the first grayscale conversion characteristic; applying the first grayscale conversion process to the video signal by using the first grayscale conversion characteristic; and applying a second grayscale conversion process to the video signal to which the first grayscale conversion process has been applied, by using the corrected second grayscale conversion characteristic.

According to a third aspect, the present invention provides a computer-readable recording medium having recorded an image processing program causing a computer to apply a grayscale conversion process to a video signal transferred from an image capturing unit, the image processing program causing the computer to execute the processes of: calculating a second grayscale conversion characteristic from a video signal to which a first grayscale conversion process has been applied by using a first grayscale conversion characteristic used to convert an M-bit video signal into an N-bit video signal, where M and N are integers and M is larger than N; correcting the second grayscale conversion characteristic by using the first grayscale conversion characteristic; applying the first grayscale conversion process to the video signal by using the first grayscale conversion characteristic; and applying a second grayscale conversion process to the video signal to which the first grayscale conversion process has been applied, by using the corrected second grayscale conversion characteristic.

According to the present invention, a high-quality video signal can be obtained.

DETAILED DESCRIPTION OF THE INVENTION

An image capturing system, an image processing method, and an image processing program according to an embodiment of the present invention will be described below with reference to the drawings.

Figure 1:
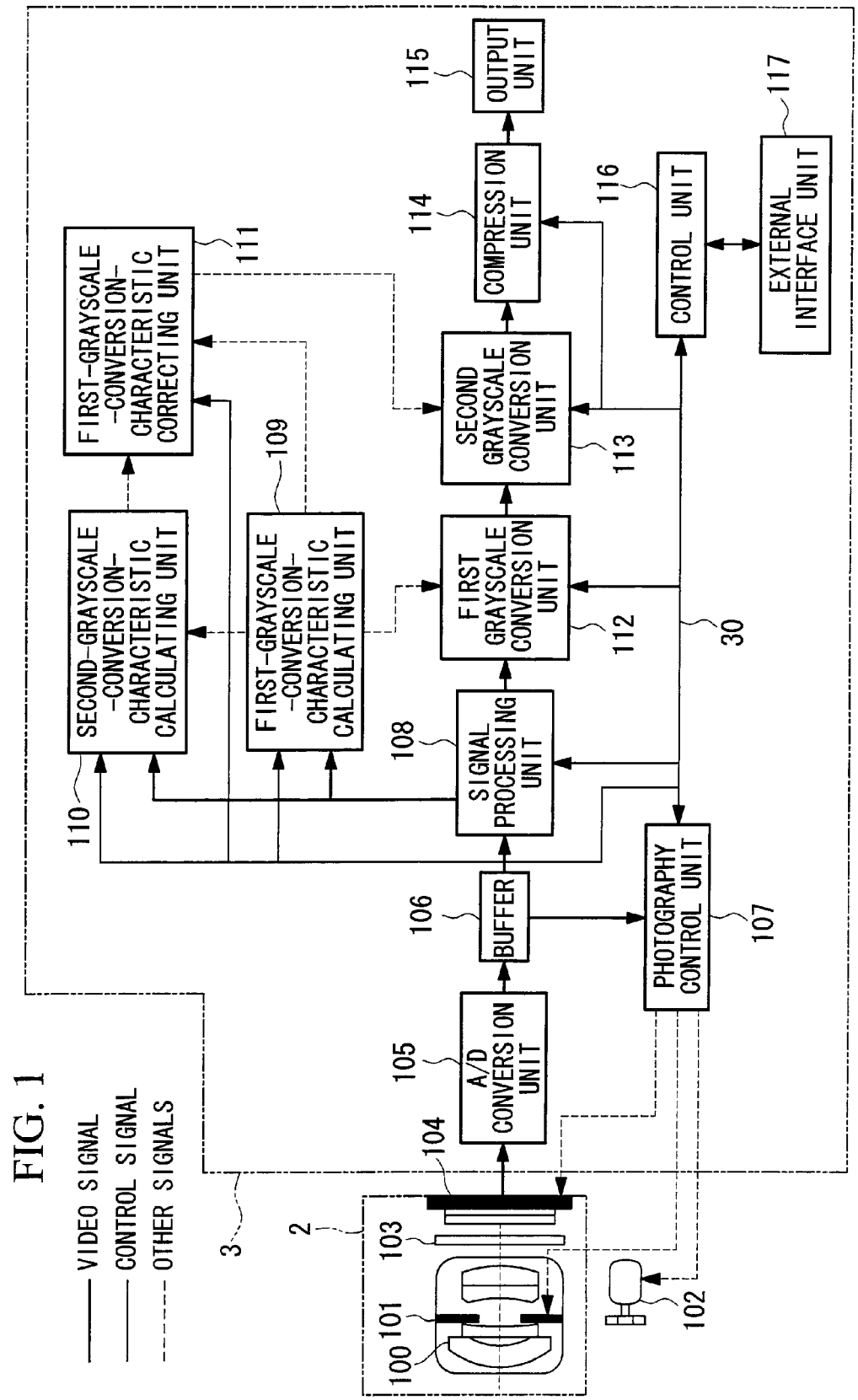
FIG. 1 is a diagram showing an overall schematic configuration of an image capturing system according to an embodiment of the present invention.

FIG. 1 is a block diagram showing a schematic configuration of the image capturing system according to the embodiment of the present invention. The image capturing system of the present invention is, for example, a digital camera and includes an image capturing unit 2 and an image processing unit 3, as shown in FIG. 1. The image capturing unit 2 includes a lens system 100, a shutter (not shown), an aperture stop 101, a color filter 103, a CCD 104, an autofocus (AF) motor 102, etc. A video signal which is an analog signal obtained by the image capturing unit 2 is input to the image processing unit 3.

The image processing unit 3 is, for example, an ASIC and includes an analog/digital conversion unit (hereinafter referred to as "A/D conversion unit") 105, a buffer 106, a photography control unit 107, a signal processing unit 108, a first-grayscale-conversion-characteristic calculating unit 109, a second-grayscale-conversion-characteristic calculating unit 110, a second-grayscale-conversion-characteristic correcting unit 111, a first grayscale conversion unit 112, a second grayscale conversion unit 113, a compression unit 114, a control unit 116, etc. Those units are connected to each other via a data bus 30 in the image processing unit 3. The image processing unit 3 includes an output unit 115 and an external interface unit 117 which has a power switch, a shutter button, and an interface for switching among various modes used in photographing.

In the image processing unit 3, the control unit 116 controls each unit.

The A/D conversion unit 105 converts the input analog video signal into a digital video signal and outputs the digital video signal to the buffer 106. The buffer 106 holds the video signal received from the A/D conversion unit 105.

The photography control unit 107 reads a single-plane video signal held in the buffer 106, according to a control signal sent from the control unit 116, and detects contrast information in an AF area of the video signal. Then, the photography control unit 107 controls the AF motor 102 such that the contrast in the AF area becomes maximum, thereby bringing the subject into focus. In order to obtain appropriate exposure, the photography control unit 107 controls the aperture stop 101 and the electronic shutter speed for the CCD 104 by using the luminance level in the video signal held in the buffer 106 or a luminance sensor (not shown).

Note that, instead of the above-mentioned focusing method, another method may be used in which, for example, an external infrared sensor is provided and the photography control unit 107 controls the AF motor 102 according to the distance to the main subject, measured by the external infrared sensor, thereby bringing the subject into focus.

The signal processing unit 108 reads the single-plane video signal held in the buffer 106, according to a control signal sent from the control unit 116. Then, the signal processing unit 108 applies known signal processing such as an interpolation process and a white balance process to the read video signal to generate a three-plane video signal. Further, the signal processing unit 108 may convert an RGB signal into a YCbCr signal, as shown in Equation (1).

The signal processing unit 108 outputs the video signal, to which the above-mentioned signal processing has been applied, to the first-grayscale-conversion-characteristic calculating unit 109, the second-grayscale-conversion-characteristic calculating unit 110, and the first grayscale conversion unit 112.

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad (1)$$

The first-grayscale-conversion-characteristic calculating unit 109 calculates a first grayscale conversion characteristic (for example, a gamma curve) which is used to convert the video signal, having M bits, transferred from the signal processing unit 108 into a video signal having N bits (M and N are integers, and M is larger than N), and outputs the calculated first grayscale conversion characteristic to the second-grayscale-conversion-characteristic calculating unit 110, the second-grayscale-conversion-characteristic correcting unit 111, and the first grayscale conversion unit 112.

For example, the first-grayscale-conversion-characteristic calculating unit 109 holds a plurality of first grayscale conversion characteristics associated with various setting conditions used in photographing, such as those for a display mode and a photographing mode. The first-grayscale-conversion-characteristic calculating unit 109 extracts, from among the plurality of first grayscale conversion characteristics, a first grayscale conversion characteristic that is associated with a setting condition used in photographing, which is received from the control unit 116. The invention is not limited to the above-mentioned calculation method; another known method of calculating a first grayscale conversion characteristic can be used.

Figure 2:
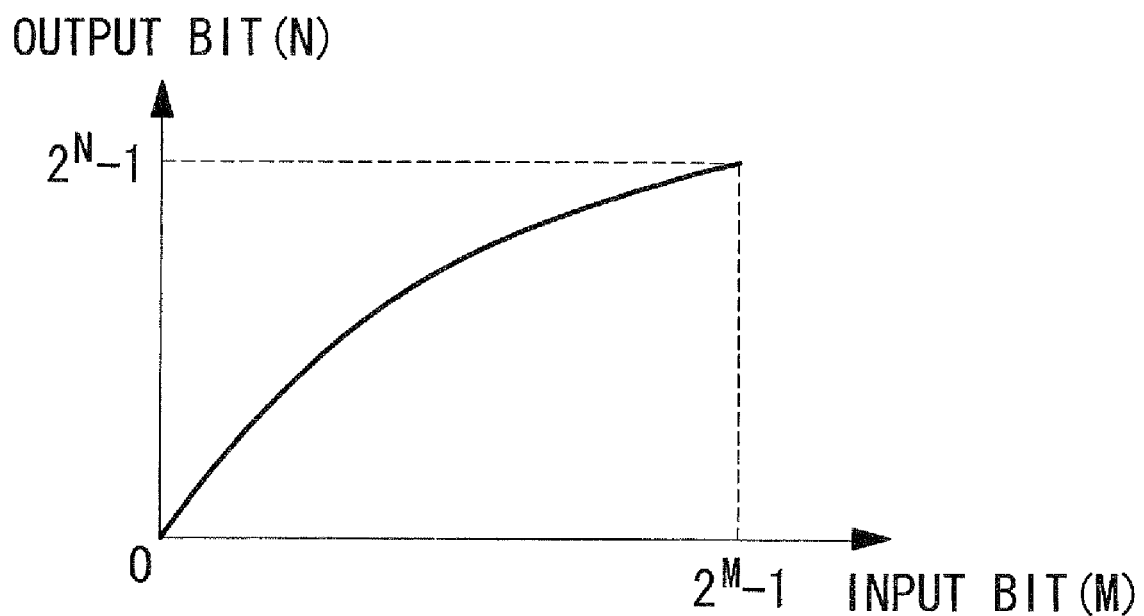
FIG. 2 is a diagram showing an example first grayscale conversion characteristic.

FIG. 2 shows an example first grayscale conversion characteristic. In FIG. 2, the first grayscale conversion characteristic is shown with grayscale in a dark region being taken into account. The first grayscale conversion characteristic is expressed by a predetermined function formula or a table, for example.

Figure 3:
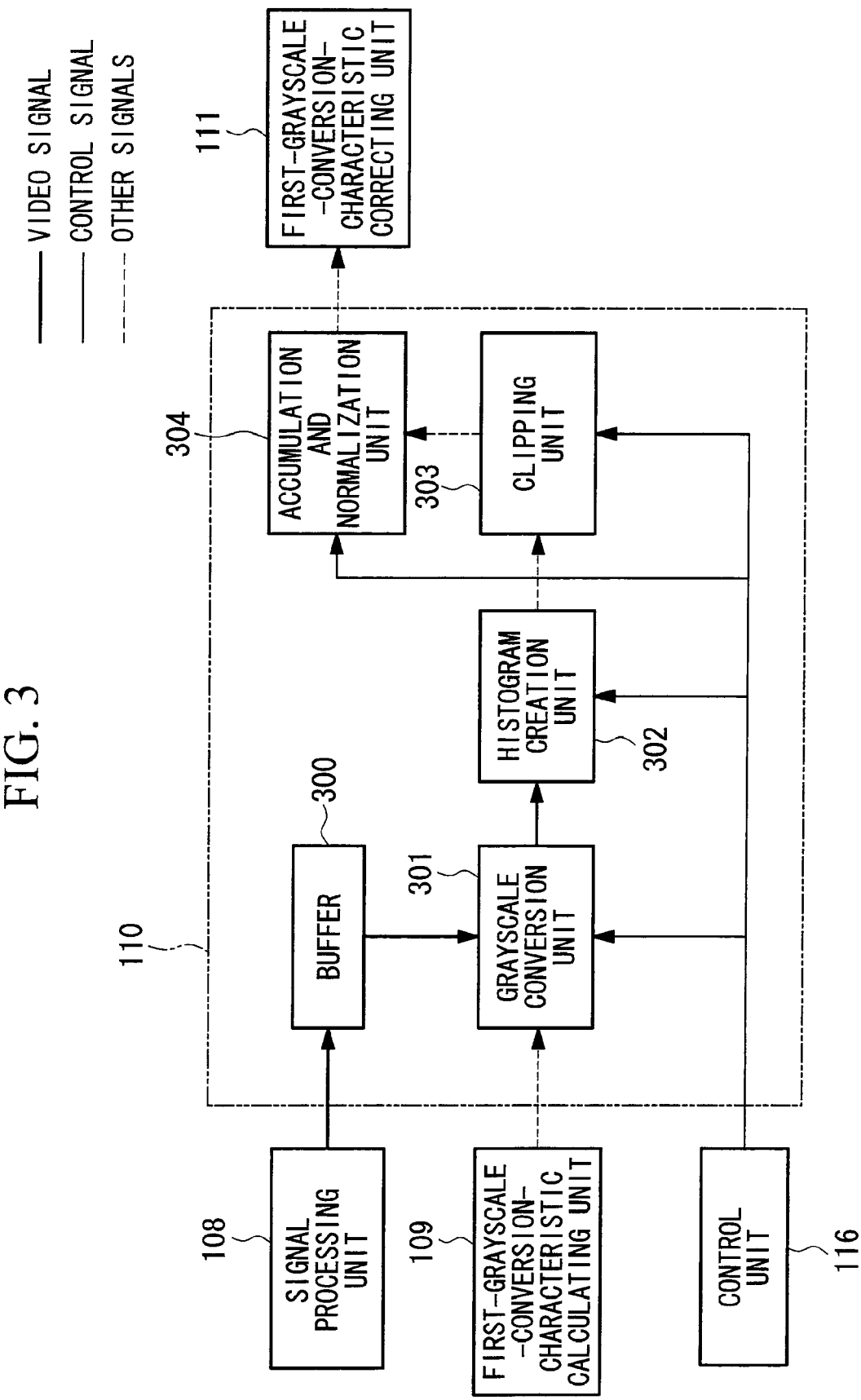
FIG. 3 is a block diagram showing an example configuration of a second-grayscale-conversion-characteristic calculating unit.

As shown in FIG. 3, the second-grayscale-conversion-characteristic calculating unit 110 includes a buffer 300, a grayscale conversion unit 301, a histogram creation unit 302, a clipping unit 303, and an accumulation and normalization unit (accumulated-value calculating unit) 304. The video signal sent from the signal processing unit 108 is transferred to and held in the buffer 300. The grayscale conversion unit 301 reads the video signal from the buffer 300 according to a control signal sent from the control unit 116, applies a first grayscale conversion process to the read video signal by using the first grayscale conversion characteristic transferred from the first-grayscale-conversion-characteristic calculating unit 109, and outputs the video signal to which the first grayscale conversion process has been applied to the histogram creation unit 302.

Figure 4:
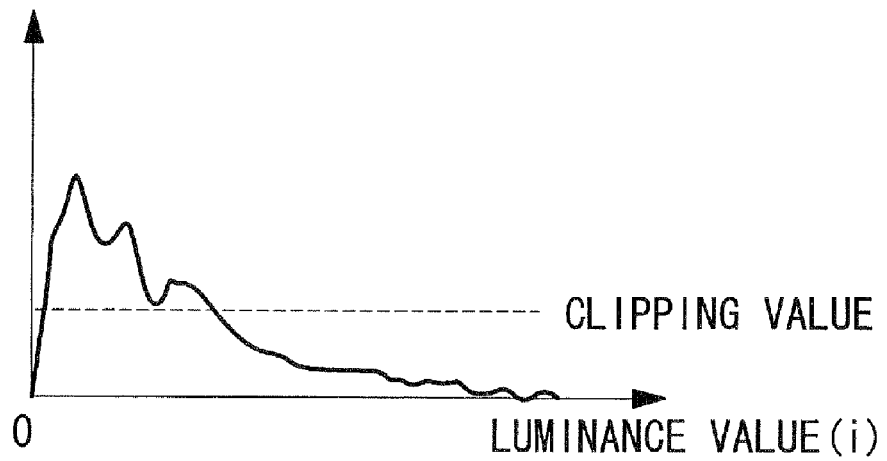
FIG. 4 is a diagram showing an example histogram created by a histogram creation unit.

The histogram creation unit 302 calculates a histogram of the video signal transferred from the grayscale conversion unit 301 and outputs the histogram to the clipping unit 303. FIG. 4 is a diagram showing an example histogram created by the histogram creation unit 302.

Figure 5:
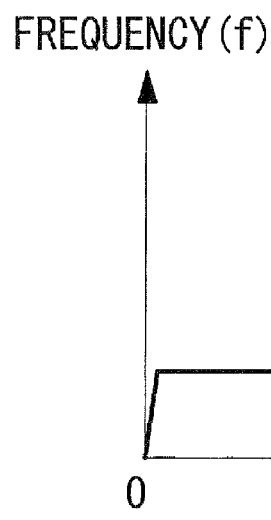
FIG. 5 is a diagram showing an example histogram to which a clipping process has been applied by a clipping unit.

The clipping unit 303 applies a clipping process to the histogram created by the histogram creation unit 302 by using a predetermined clipping value, as shown in FIG. 5, and outputs the histogram to which the clipping process has been applied to the accumulation and normalization unit 304.

Figure 6:
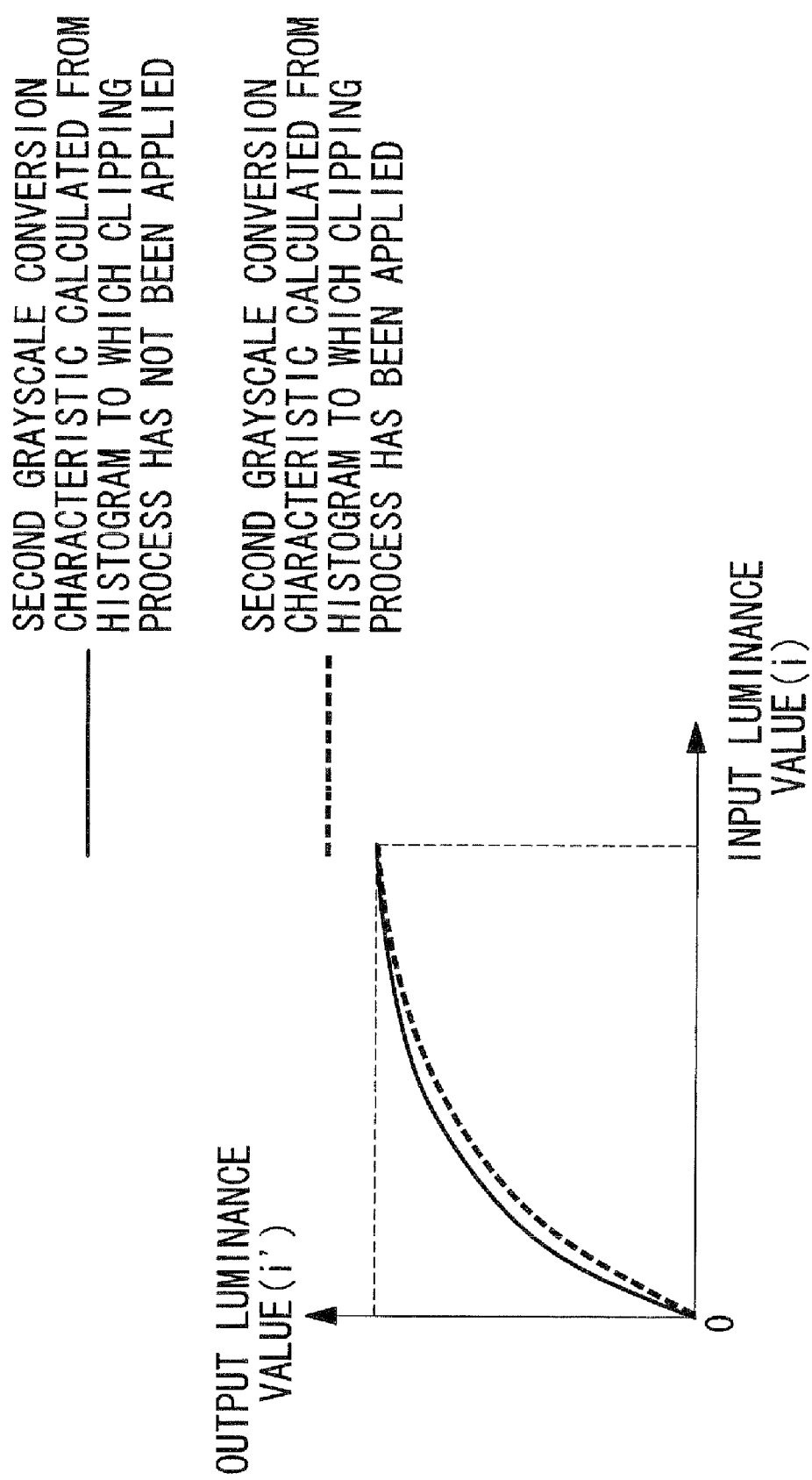
FIG. 6 is a diagram showing comparison between a second grayscale conversion characteristic created based on a histogram to which the clipping process has not been applied and a second grayscale conversion characteristic created based on the histogram to which the clipping process has been applied.

The accumulation and normalization unit 304 applies an accumulation process to the histogram transferred from the clipping unit 303, calculates a second grayscale conversion characteristic, and outputs the second grayscale conversion characteristic to the second-grayscale-conversion-characteristic correcting unit 111. FIG. 6 shows example second grayscale conversion characteristics. In FIG. 6, the solid line indicates an example second grayscale conversion characteristic that is calculated from a histogram to which the clipping process has not been applied, and the dotted line indicates an example second grayscale conversion characteristic that is calculated from the histogram to which the clipping process has been applied. As is clear from FIG. 6, when the clipping process is applied, a second grayscale conversion characteristic that does not enhance the contrast much can be obtained.

Figure 7:
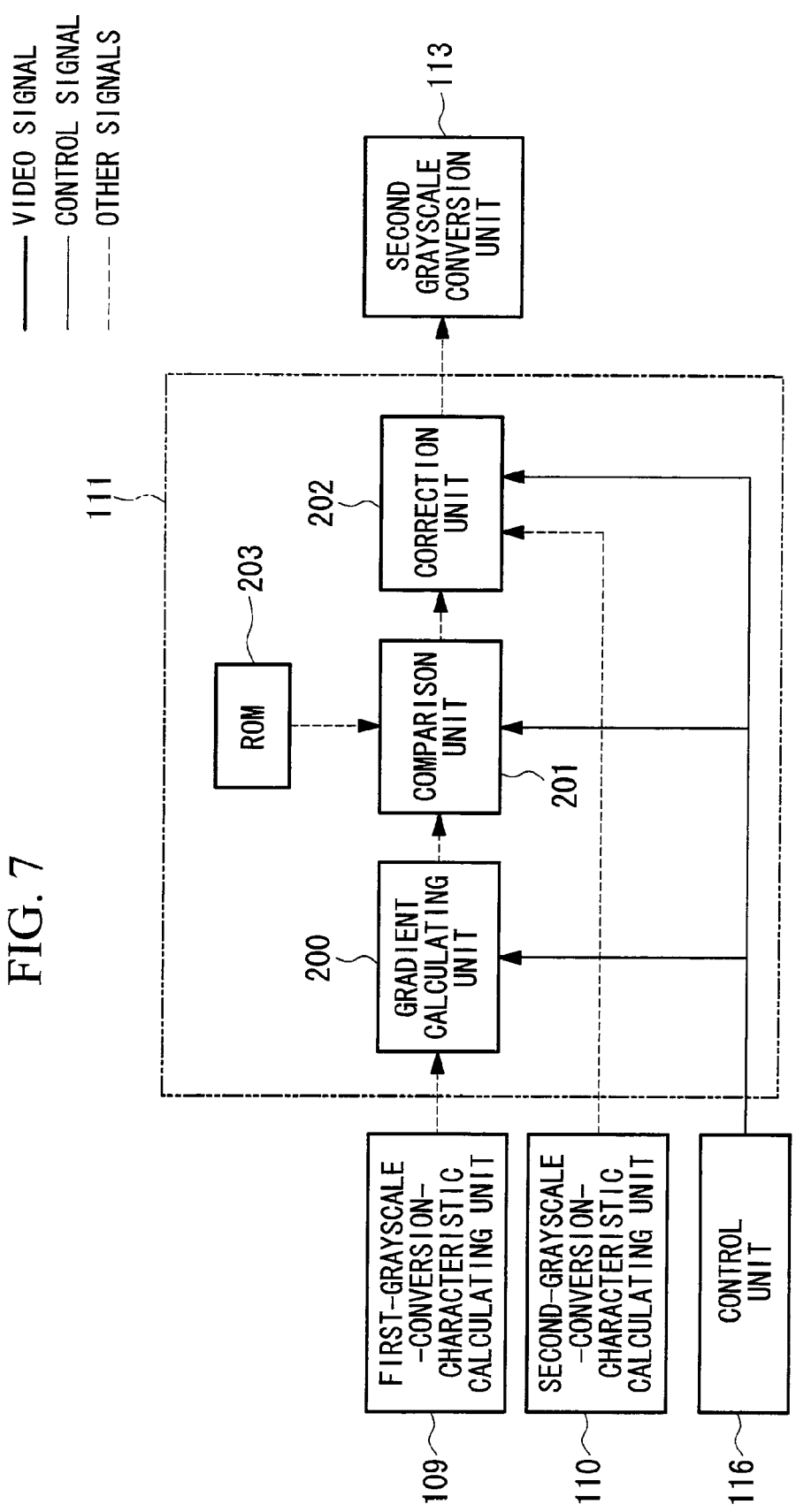
FIG. 7 is a diagram showing an example configuration of a second-grayscale-conversion-characteristic correcting unit.

As shown in FIG. 7, the second-grayscale-conversion-characteristic correcting unit 111 includes a gradient calculating unit 200, a comparison unit 201, a correction unit 202, and a ROM 203.

The gradient calculating unit 200 calculates the gradient which indicates the change in an output bit with respect to the change in each input bit in the first grayscale conversion characteristic calculated by the first-grayscale-conversion-characteristic calculating unit 109, and outputs the gradient to the comparison unit 201. Specifically, the gradient for each input bit in the first grayscale conversion characteristic is calculated through differentiation.

The comparison unit 201 reads a predetermined threshold stored in the ROM 203, compares the threshold with the gradient transferred from the gradient calculating unit 200, identifies the region corresponding to an input bit whose gradient is smaller than the threshold, associates information of the region with the gradient, and outputs the associated gradient and region information to the correction unit 202.

Figure 8:
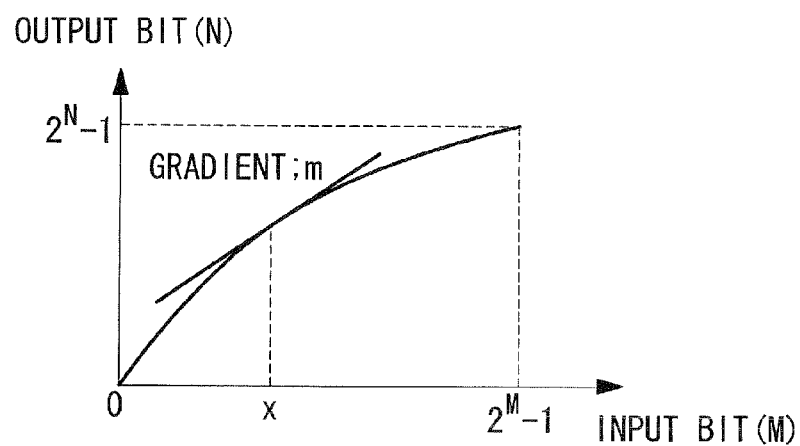
FIG. 8 is a diagram showing an example first grayscale conversion characteristic.
Figure 9:
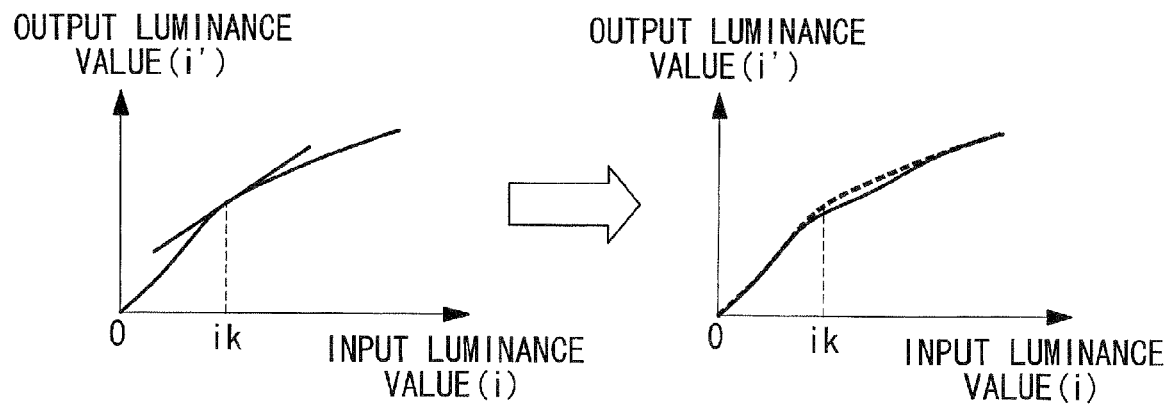
FIG. 9 is an explanatory diagram showing a change in a second grayscale conversion characteristic.

The correction unit 202 receives the second grayscale conversion characteristic from the second-grayscale-conversion-characteristic calculating unit 110 and receives the gradient and the region information from the comparison unit 201. The correction unit 202 corrects the second grayscale conversion characteristic according to the gradient in the first grayscale conversion characteristic. Specifically, the correction unit 202 corrects the second grayscale conversion characteristic such that the gradient in the second grayscale conversion characteristic becomes smaller in a region in the second grayscale conversion characteristic, corresponding to the region identified by the comparison unit 201. For example, in a case of a first grayscale conversion characteristic shown in FIG. 8, when the comparison unit 201 judges that a gradient m for an input bit value x is smaller than the predetermined threshold, the correction unit 202 reduces the gradient in the second grayscale conversion characteristic at an input luminance value ik corresponding to the input bit value x, as shown in FIG. 9, thereby reducing the contrast enhancement level at the input luminance value ik. As described above, correction is applied in order to reduce the contrast enhancement level to a region where the contrast is usually enhanced because a small number of bits are allocated to the region and thus a tone jump tends to be seen, so that the occurrence of tone jumps can be prevented. The second-grayscale-conversion-characteristic correcting unit 111 outputs the corrected second grayscale conversion characteristic to the second grayscale conversion unit 113.

Referring back to FIG. 1, the first grayscale conversion unit 112 uses the first grayscale conversion characteristic transferred from the first-grayscale-conversion-characteristic calculating unit 109 to apply a first grayscale conversion process to the video signal transferred from the signal processing unit 108, and outputs the video signal to which the first grayscale conversion process has been applied to the second grayscale conversion unit 113.

The second grayscale conversion unit 113 uses the second grayscale conversion characteristic transferred from the second-grayscale-conversion-characteristic correcting unit 111 to apply a second grayscale conversion process to the video signal transferred from the first grayscale conversion unit 112, and outputs the video signal to which the second grayscale conversion process has been applied to the compression unit 114.

The compression unit 114 applies a known compression process, such as JPEG, to the video signal transferred from the second grayscale conversion unit 113, and outputs a compressed video signal to the output unit 115. The output unit 115 stores the compressed video signal in a memory card (not shown) or the like. Alternatively, the output unit 115 displays the video signal on an external display device.

Next, an operation of the image capturing system according to this embodiment will be described.

When the user specifies photographic conditions such as the ISO sensitivity and exposure and presses the shutter button halfway, via the external interface unit 117, the image capturing system enters a pre-photographing mode. In the pre-photographing mode, a video signal is obtained via the lens system 100, the aperture stop 101, the color filter 103, and the CCD 104. The video signal is then converted into a digital signal in the A/D conversion unit 105 and the converted video signal is transferred to the buffer 106. In this embodiment, it is assumed that the CCD 104 is a single CCD of an RGB primary color system, and that the grayscale width of the signal handled by the A/D conversion unit 105 corresponds to M bits.

The photography control unit 107 reads the video signal held in the buffer 106, detects contrast information in the AF area of the video signal, and controls the AF motor 102 such that the detected contrast information becomes maximum, thereby bringing the subject into focus. Further, in order to obtain appropriate exposure, the photography control unit 107 controls the aperture stop 101 and the electronic shutter speed for the CCD 104 by using the luminance level in the video signal, or the like.

Next, when the user completely presses the shutter button via the external interface unit 117, the actual photographing is performed. In the actual photographing, the subject is photographed based on the focus conditions and the exposure conditions calculated by the photography control unit 107. A video signal obtained by the image capturing unit 2 is converted into a digital signal by the A/D conversion unit 105 and the digital video signal is transferred to and stored in the buffer 106. While the video signal is being obtained, various kinds of setting information used in the photographing, such as the exposure conditions and the focus conditions, are transferred from the photography control unit 107 to the control unit 116. Further, the various kinds of setting information used in the photographing are transferred from the control unit 116 to the first-grayscale-conversion-characteristic calculating unit 109.

The signal processing unit 108 reads the single-plane video signal from the buffer 106 under the control of the control unit 116 and applies known processing, such as an interpolation process and a white balance process, to the video signal, thereby generating a three-plane video signal.

The video signal obtained through the processes in the signal processing unit 108 is transferred to the first-grayscale-conversion-characteristic calculating unit 109, the second-grayscale-conversion-characteristic calculating unit 110, and the first grayscale conversion unit 112. The first-grayscale-conversion-characteristic calculating unit 109 calculates a first grayscale conversion characteristic based on the video signal and various setting conditions used in the photographing, for example, a setting condition for the display mode or a setting condition for the photographing mode, transferred from the control unit 116. The calculated first grayscale conversion characteristic is transferred to the second-grayscale-conversion-characteristic calculating unit 110, the second-grayscale-conversion-characteristic correcting unit 111, and the first grayscale conversion unit 112.

In the second-grayscale-conversion-characteristic calculating unit 110 (see FIG. 3), the grayscale conversion unit 301 applies a first grayscale conversion process using the first grayscale conversion characteristic to the video signal transferred from the signal processing unit 108, the histogram creation unit 302 creates a histogram based on the video signal to which the first grayscale conversion process has been applied, and the clipping unit 303 applies a clipping process to the histogram. The histogram to which the clipping process has been applied is transferred to the accumulation and normalization unit 304, and a second grayscale conversion characteristic is generated in the accumulation and normalization unit 304. The second grayscale conversion characteristic is transferred to the second-grayscale-conversion-characteristic correcting unit 111.

In the second-grayscale-conversion-characteristic correcting unit 111, the gradient calculating unit 200 calculates a gradient of the first grayscale conversion characteristic transferred from the first-grayscale-conversion-characteristic calculating unit 109, and the comparison unit 201 compares the gradient with the threshold to identify the region corresponding to an input bit whose gradient is smaller than the threshold and transfers information of the region and the gradient to the correction unit 202. The correction unit 202 corrects the second grayscale conversion characteristic based on the information transferred from the comparison unit 201 to make the gradient for a region to which a small number of bits are allocated smaller, thereby reducing the contrast enhancement level. The corrected second grayscale conversion characteristic is transferred to the second grayscale conversion unit 113.

The first grayscale conversion unit 112 applies a first grayscale conversion process using the first grayscale conversion characteristic calculated by the first-grayscale-conversion-characteristic calculating unit 109 to the video signal transferred from the signal processing unit 108. The video signal to which the first grayscale conversion process has been applied is transferred to the second grayscale conversion unit 113. The second grayscale conversion unit 113 applies a second grayscale conversion process using the second grayscale conversion characteristic corrected by the second-grayscale-conversion-characteristic correcting unit 111 to the video signal to which the first grayscale conversion process has been applied. The video signal to which the second grayscale conversion process has been applied is sent to the output unit 115 via the compression unit 114.

It is assumed in the above description that the processes are performed by hardware, but the present invention is not limited to such a configuration. For example, it is also possible to use a configuration in which a video signal sent from the CCD 104 is transferred to the image processing unit 3 as unprocessed raw data, and the ISO sensitivity information and the video signal size are also transferred to the image processing unit 3 as header information of the video signal, and the image processing unit 3 separately processes the received data items by software.

In that case, the image processing unit 3 includes a CPU, a main storage device such as a RAM, and a computer-readable recording medium having a recorded image processing program which implements all or part of the above-described processes. The CPU reads the image processing program recorded in the recording medium to execute information processing and calculation, thereby implementing the same processes as those performed by the respective units included in the image processing unit 3.

The computer-readable recording medium may be a magnetic disk, a magneto optical disk, a semiconductor memory, or the like. Alternatively, this computer program may be delivered to a computer through a communication line and executed by the computer which has received the computer program.

Figure 10:
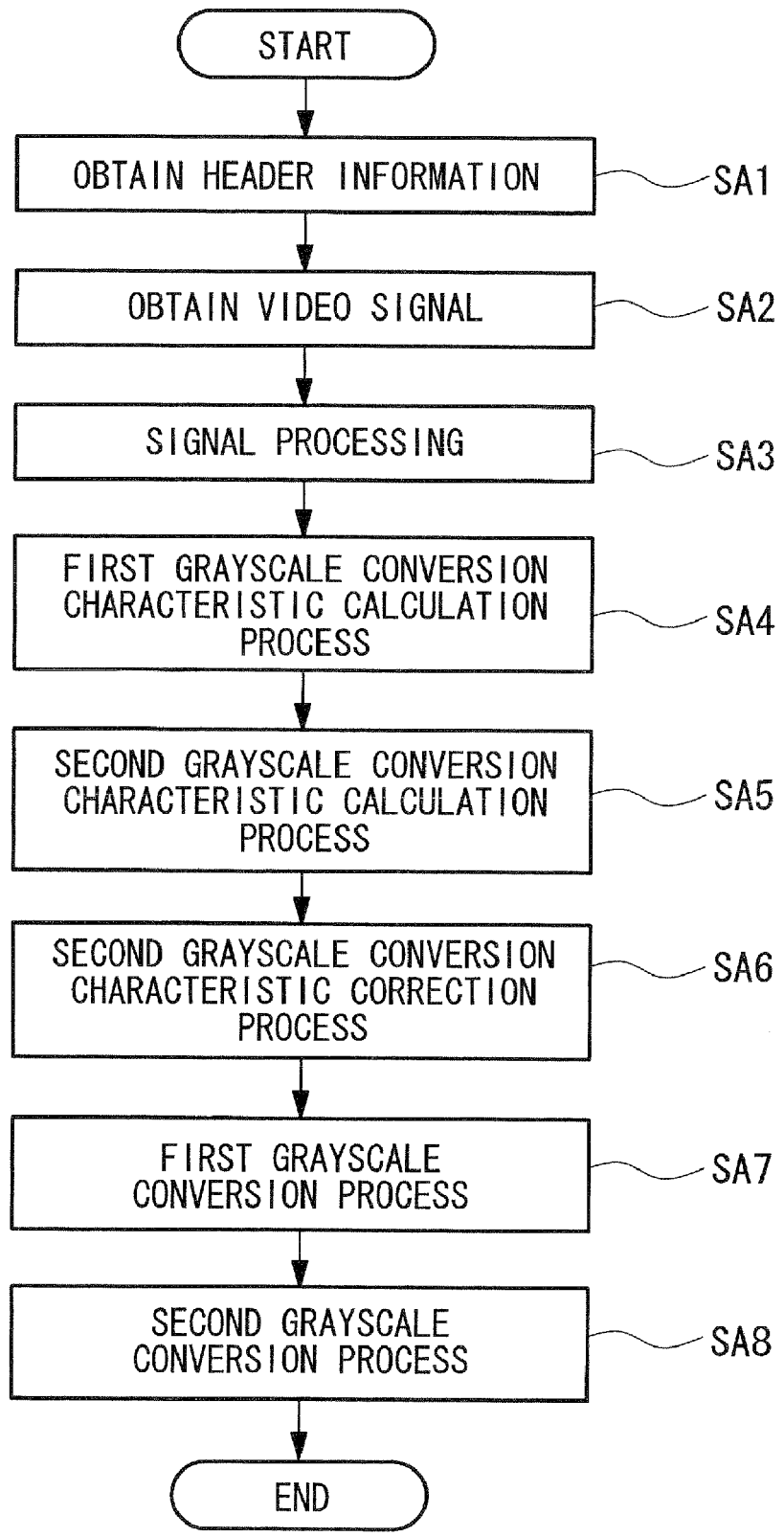
FIG. 10 is a flowchart showing a processing procedure of an image processing method.

A processing procedure of an image processing method implemented when the CPU executes the image processing program will be described below with reference to FIG. 10.

First, header information is read in Step SA1, and a video signal is read in Step SA2. In Step SA3, known signal processing such as a white balance process is applied to the video signal read in Step SA2. In Step SA4, a first grayscale conversion characteristic is calculated based on the video signal to which the signal processing has been applied in Step SA3.

In Step SA5, a first grayscale conversion process using the first grayscale conversion characteristic obtained in Step SA4 is applied to the video signal read in Step SA2, and a second grayscale conversion characteristic is calculated based on the video signal to which the first grayscale conversion process has been applied. In Step SA6, the second grayscale conversion characteristic is corrected by using the first grayscale conversion characteristic obtained in Step SA4.

In Step SA7, a first grayscale conversion process using the first grayscale conversion characteristic obtained in Step SA4 is applied to the video signal obtained in Step SA3. In Step SA8, a second grayscale conversion process using the second grayscale conversion characteristic corrected in Step SA6 is applied to the video signal obtained in Step SA7.

As described above, according to the image capturing system, the image processing method, and the image processing program of this embodiment, the second grayscale conversion characteristic is corrected so as to reduce the contrast enhancement level for a region to which a small number of bits are allocated, and the corrected second grayscale conversion characteristic is used when applying the second grayscale conversion process to the video signal. In this way, a grayscale conversion process appropriate for the video signal is performed, so that it is possible to reduce tone jumps and to calculate a high-quality video signal.

[Modification 1]

In the above-described embodiment, a gradient of the second grayscale conversion characteristic is directly corrected. Instead of this method, a clipping value for the histogram used to calculate the second grayscale conversion characteristic may be adjusted to correct the second grayscale conversion characteristic.

In that case, in addition to the second grayscale conversion characteristic, the histogram created by the histogram creation unit 302 and the clipping value used by the clipping unit 303 are also transferred from the second-grayscale-conversion-characteristic calculating unit 110 to the second-grayscale-conversion-characteristic correcting unit 111.

The second-grayscale-conversion-characteristic correcting unit 111 adjusts the clipping value used by the clipping unit 303 according to a result of comparison performed by the comparison unit 201, in other words, according to a gradient of the first grayscale conversion characteristic. For example, the clipping value is adjusted according to the ratio of a region whose gradient is smaller than a predetermined threshold with respect to the whole region. More specifically, in the first grayscale conversion characteristic shown in FIG. 8, the larger the number of regions whose gradient is smaller than the predetermined threshold, the smaller the clipping value is made.

The correction unit 202 uses the corrected clipping value to apply the clipping process again to the histogram created by the histogram creation unit 302 and uses the histogram to which the clipping process has been applied to calculate the second grayscale conversion characteristic again, thereby obtaining a corrected second grayscale conversion characteristic. The method of generating the second grayscale conversion characteristic from the histogram to which the clipping process has been applied is the same as that performed in the accumulation and normalization unit 304.

As described above, when the clipping value is changed, the second grayscale conversion characteristic is corrected as a whole, thereby allowing more natural grayscale conversion to be applied.

In the above description, the correction unit 202 applies the clipping process and recreates the second grayscale conversion characteristic. However, the present invention is not limited to this configuration. For example, the adjusted clipping value may be transferred from the correction unit 202 to the clipping unit 303 of the second-grayscale-conversion-characteristic calculating unit 110. With this configuration, it is possible to cause the clipping unit 303 to apply the clipping process again and to cause the accumulation and normalization unit 304 to calculate the second grayscale conversion characteristic based on the histogram to which the clipping process has been applied. Therefore, the device configuration can be simplified further.

[Modification 2]

Figure 11:
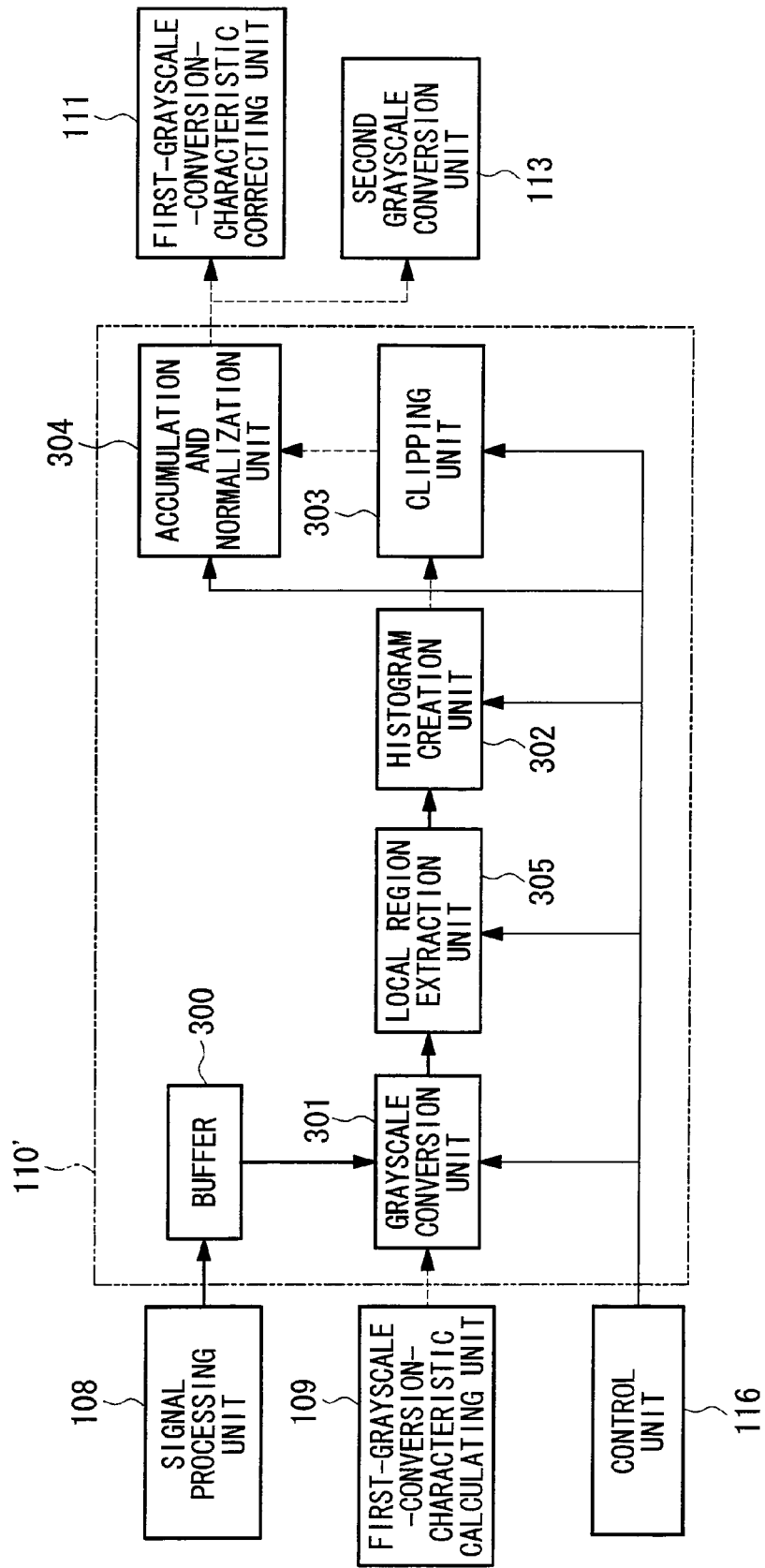
FIG. 11 is a diagram showing an example configuration of a second-grayscale-conversion-characteristic calculating unit according to Modification 2.

The configuration of the second-grayscale-conversion-characteristic calculating unit 110 according to the above-described embodiment is merely an example. For example, it is possible to use a configuration in which a local region extraction unit 305 is further included, as shown in FIG. 11. In a second-grayscale-conversion-characteristic calculating unit 110' having this configuration, the local region extraction unit 305 extracts local regions, each of which includes a pixel of interest at the center, from the video signal transferred from the grayscale conversion unit 301 and transfers the local regions to the histogram creation unit 302. The histogram creation unit 302 creates a histogram for each of the local regions and transfers the histogram to the clipping unit 303. The clipping unit 303 applies the clipping process to the histogram and transfers the histogram to which the clipping process has been applied to the accumulation and normalization unit 304. The accumulation and normalization unit 304 applies the accumulation process to the histogram for each of the local regions, to which the clipping process has been applied, to calculate a grayscale conversion characteristic for the pixel of interest. With this configuration, it is possible to calculate a grayscale conversion characteristic individually for each pixel in the video signal and to perform a more-flexible grayscale conversion process.

[Modification 3]

Instead of the accumulation and normalization unit 304 of the second-grayscale-conversion-characteristic calculating unit 110, it is possible to provide a calculation unit which, for example, holds in advance a table storing a plurality of second grayscale conversion characteristics and which obtains a second grayscale conversion characteristic by selecting an appropriate second grayscale conversion characteristic from the plurality of second grayscale conversion characteristics according to information of a histogram created by the histogram creation unit 302.

[Modification 4]

Instead of the accumulation and normalization unit 304 of the second-grayscale-conversion-characteristic calculating unit 110, it is possible to provide a calculation unit which holds a plurality of gamma values, selects an appropriate gamma value therefrom according to information of a histogram, sets a gamma curve from the gamma value, and obtains a second grayscale conversion characteristic.

[Modification 5]

In the above-described embodiment, the accumulation and normalization unit 304 uses a histogram to which the clipping process has been applied by the clipping unit 303 to generate a second grayscale conversion characteristic. Instead of this configuration, it is possible to use a configuration in which the clipping unit 303 is eliminated from the components and a histogram to which the clipping process has not been applied is used to calculate a second grayscale conversion characteristic.

What is claimed is:

1. An image capturing system that applies grayscale conversion to a video signal from an image capturing unit and outputs the grayscale-converted video signal, comprising:

a second-grayscale-conversion-characteristic calculating unit that calculates a second grayscale conversion characteristic from a video signal to which a first grayscale conversion process has been applied by using a first grayscale conversion characteristic used to convert an M-bit video signal into an N-bit video signal, where M and N are integers and M is larger than N;

a second-grayscale-conversion-characteristic correcting unit that corrects the second grayscale conversion characteristic calculated by the second-grayscale-conversion-characteristic calculating unit, by using the first grayscale conversion characteristic;

a first grayscale conversion unit that applies the first grayscale conversion process to the video signal by using the first grayscale conversion characteristic; and a second grayscale conversion unit that applies a second grayscale conversion process to the video signal to which the first grayscale conversion process has been applied by the first grayscale conversion unit, by using the second grayscale conversion characteristic corrected by the second-grayscale-conversion-characteristic correcting unit.

2. An image capturing system according to claim 1, wherein the second-grayscale-conversion-characteristic correcting unit comprises:

a gradient calculation unit that calculates a gradient indicating a change in an output bit with respect to a change in an input bit in the first grayscale conversion characteristic; and a correction unit that corrects the second grayscale conversion characteristic according to the gradient.

3. An image capturing system according to claim 2, wherein:
the second-grayscale-conversion-characteristic correcting unit further comprises a comparison unit that compares the gradient in the first grayscale conversion characteristic with a predetermined threshold and identifies, in the first grayscale conversion characteristic, a region whose gradient is smaller than the threshold; and
the correction unit corrects the second grayscale conversion characteristic such that, in a region in the second grayscale conversion characteristic corresponding to the region identified by the comparison unit, a gradient indicating a change in an output bit with respect to a change in an input bit in the second grayscale conversion characteristic becomes small.

4. An image capturing system according to claim 2, wherein:
the second-grayscale-conversion-characteristic calculating unit comprises:
a histogram calculation unit that calculates a histogram of the video signal to which the first grayscale conversion process using the first grayscale conversion characteristic has been applied;
a clipping unit that applies a clipping process to the histogram by using a predetermined clipping value; and
a calculation unit that calculates the second grayscale conversion characteristic by using the histogram to which the clipping process has been applied; and
the correction unit changes the clipping value based on a result of the comparison performed by the comparison unit, applies a clipping process to the histogram calculated by the histogram calculation unit, by using the changed clipping value, calculates the second grayscale conversion characteristic by using the histogram to which the clipping process has been applied, and outputs the second grayscale conversion characteristic to the second grayscale conversion unit as the corrected second grayscale conversion characteristic.

5. An image capturing system according to claim 4, wherein the correction unit supplies the changed clipping value to the second-grayscale-conversion-characteristic calculating unit, causes the clipping unit to apply the clipping process using the changed clipping value to the histogram calculated by the histogram calculation unit, and causes the calculation unit to calculate the second grayscale conversion characteristic based on the histogram to which the clipping process has been applied.

6. An image capturing system according to claim 4, wherein the correction unit changes the clipping value to a smaller value when the percentage of a region whose gradient is smaller than a predetermined threshold is larger in the first grayscale conversion characteristic.

7. An image capturing system according to claim 1, wherein the second-grayscale-conversion-characteristic calculating unit comprises:
a histogram calculation unit that calculates a histogram of the video signal to which the first grayscale conversion process using the first grayscale conversion characteristic has been applied; and
a calculation unit that calculates the second grayscale conversion characteristic by using the histogram.

8. An image capturing system according to claim 7, wherein the calculation unit holds a plurality of the second grayscale conversion characteristics and selects one second grayscale conversion characteristic from the plurality of the second grayscale conversion characteristics according to the histogram.

9. An image capturing system according to claim 7, wherein the calculation unit holds a plurality of gamma values, selects one gamma value from the plurality of gamma values according to the histogram, sets a gamma curve by using the selected gamma value, and uses the gamma curve as the second grayscale conversion characteristic.

10. An image capturing system according to claim 7, wherein the calculation unit comprises:
a clipping unit that applies a clipping process to the histogram; and
an accumulated-value calculating unit that calculates the second grayscale conversion characteristic by calculating an accumulated value of the histogram to which the clipping process has been applied.

11. An image capturing system according to claim 1, wherein the first grayscale conversion characteristic is determined based on various setting conditions for a display mode and a photographing mode used in photographing.

12. An image processing method of applying grayscale conversion to a video signal from an image capturing unit and outputting the grayscale-converted video signal, comprising the steps of:
calculating a second grayscale conversion characteristic from a video signal to which a first grayscale conversion process has been applied by using a first grayscale conversion characteristic used to convert an M-bit video signal into an N-bit video signal, where M and N are integers and M is larger than N;
correcting the second grayscale conversion characteristic by using the first grayscale conversion characteristic;
applying the first grayscale conversion process to the video signal by using the first grayscale conversion characteristic; and
applying a second grayscale conversion process to the video signal to which the first grayscale conversion process has been applied, by using the corrected second grayscale conversion characteristic.

13. A computer-readable recording medium having recorded an image processing program causing a computer to apply a grayscale conversion process to a video signal transferred from an image capturing unit, the image processing program causing the computer to execute the processes of:
calculating a second grayscale conversion characteristic from a video signal to which a first grayscale conversion process has been applied by using a first grayscale conversion characteristic used to convert an M-bit video signal into an N-bit video signal, where M and N are integers and M is larger than N;
correcting the second grayscale conversion characteristic by using the first grayscale conversion characteristic;
applying the first grayscale conversion process to the video signal by using the first grayscale conversion characteristic; and
applying a second grayscale conversion process to the video signal to which the first grayscale conversion process has been applied, by using the corrected second grayscale conversion characteristic.

* * * * *